Sept. 13, 1966   R. C. HARRINGTON, JR., ET AL   3,272,687
VAPOR PERMEABLE NON-WOVEN FIBROUS ELEMENT
Filed July 22, 1964
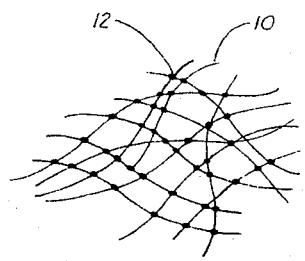
ROBERT C. HARRINGTON, JR.
JAMES L. SMITH
JAMES H. BOND
   INVENTORS
BY *R. Frank Smith*
*Abram W. Hatcher*
   ATTORNEYS

United States Patent Office 3,272,687
Patented Sept. 13, 1966

3,272,687
VAPOR PERMEABLE NON-WOVEN
FIBROUS ELEMENT
Robert C. Harrington, Jr., James L. Smith, and James H. Bond, Kingsport, Tenn., assignors to Eastman Kodak Company, Rochester, N.Y., a corporation of New Jersey
Filed July 22, 1964, Ser. No. 384,334
5 Claims. (Cl. 161—143)

This invention relates to a non-woven fabric. More particularly, it concerns a polypropylene vapor permeable shaped object or fibrous element bonded by polyethylene.

This invention is a continuation-in-part of our application Serial No. 157,212, filed December 5, 1961, which is in turn a continuation-in-part of our application Serial No. 54,929, filed September 9, 1960, now U.S. Patent No. 3,110,642. In our aforesaid earlier applications there has been described a process for converting fibro-plastic material substantially directly into fibrous materials such as non-woven fabrics, cable stuffing, cigarette filters and the like. The fibrous material may be prepared by applying a stream of inert gas or steam propelled substantially at right angles to the extruded polymer melt or solution, thereby attenuating the melt or solution into the form of fibers which are collected in a direction substantially countercurrent to that of the propellent stream. Once an initial collecting point is provided, these fibers adhere in the form of tow which can be packaged in any suitable manner. This tow or fibrous material may be blended with certain other fibers in non-woven fabrics. However, because of the similarity of the relatively low melting points of both polypropylene and polyethylene and the similarity of many other chemical and physical properties of each it has heretofore been unknown how to form a polypropylene non-woven fabric bonded with polyethylene as thus formed or by any other polyethylene. It is known that polyolefins in granular form may be used to cause bonding of dissimilar sheet materials by the application of heat, for example, laminated rayon non-woven material bonded with polyethylene granules as disclosed in U.S. Patent 2,992,149. Nevertheless, to the best of our knowledge no method has as yet been devised whereby polypropylene tow may be formed into bonded vapor permeable fibrous element or non-woven fabric by using polyethylene as a bonding medium. Accordingly, it is believed apparent that the development of a polypropylene non-woven fabric bonded by polyethylene represents a highly desirable result.

It is an object of this invention, therefore, to disclose a novel polypropylene non-woven fabric bonded by polyethylene, yet still retaining its vapor-permeable characteristic. A further object is to disclose a simple and economical method of bonding polypropylene in the form of a non-woven fabric by the use of polyethylene as the bonding material. A still further object is to provide a non-woven fabric suitable for use in innerliners and inert filters. Other objects will appear hereinafter.

We have found that a non-woven material containing polypropylene can be bonded with a polyethylene binder to form a vapor permeable fibrous element. The bonding may be accomplished by the use of polyethylene which has a low melt viscosity at elevated temperatures. A characteristic of this polyethylene binder, especially when fibrous form is used, is its viscosity in the neighborhood of 8000 centipoises at 20° C. above its accepted flow point. By accepted flow point we mean ASTM D36–26 ring and ball softening point. The polyethylene used may be in fibrous or wax form. When a wax form of polyethylene is used it should be an emulsifiable or water-soluble type. The polyethylene wax may be a partially oxidized low melting point polyethylene and may be blended with another wax such as paraffin.

While we do not wish to be bound by any particular theory as to why the desired bonding occurs, it appears that the above mentioned polyethylene characteristics or properties are necessary in order to have the polyethylene flow to the intersects of the polypropylene fiber and form bonds at these intersects such that a rigid vapor permeable object may be formed. Standard high density or low density polyethylene may be used or a similar degraded polyethylene. We have found especially useful polyethylene having a melting point in the neighborhood of 100° C., for Example, Eastman's Epolene C, a low-molecular weight polyethylene resin, or a similar degraded polyethylene having a melting point close to 160° C. When fibers are used the denier per filament may vary from 1.5–200, although the preferred range is from about 2 to about 16. Mixtures of such fibers or waxes may be used to obtain any desired intermediate melting point, provided the characteristic low melt viscosity at elevated temperatures is exhibited. The polypropylene which may be bonded with polyethylene fibers in accordance with our invention may be either high-density or low-density polypropylene or blends of various polypropylenes, oriented and unoriented polypropylene, polypropylene resins or degraded polypropylene. The denier per filament may be from 1.5 to 200, although better bonding is generally achieved at a denier per filament of from about 2 to about 16.

The polyethylene fiber-bonded polypropylene non-woven fabric of this invention may be formed by blending batts of polypropylene and polyethylene on a card or other conventional equipment for producing non-woven material followed by subjection to heat with or without pressure. When polyethylene wax as bonding agent is used, it may be added to polypropylene tow by spraying, dusting, or the like. Thus, a coherent, well-bonded mass of polypropylene fibers having high strength and rigidity in all directions is formed. An important advantage of such batts or fibrous bundles is that their density can be varied from a low to a very high figure, for example, from about 1 oz./sq. yd. (½″ thick) to about 4 oz./sq. yd. (½″ thick). When prepared by carding the variation in density to the desired amount may be accomplished simply by varying the degree of compression during the bonding operation.

A further understanding of our invention may be had by reference to the drawing, which is a schematic surface representation drawn to an enlarged scale of the non-woven fabric of this invention showing in detail the bonding of the polypropylene fibers at their intersects by the polyethylene.

In the drawing the non-woven fabric of this invention is shown as a fibrous reticulated web wherein the polypropylene fibers are in a random or haphazard distribution with bonds clearly shown at a large number of their intersects. The polypropylene fibers bonded at their intersects by the polyethylene are shown to have not lost their identity in any way by the bonding.

The drawing depicts a vapor permeable fibrous web of bonded polypropylene fibers consisting of a plurality of randomly arranged polyproylene fibers 10 and a plurality of polyethylene bonds 12 at various intersects of said polypropylene fibers.

The following examples are illustrative of our invention.

EXAMPLE I

60% by weight of 5 d./f., 2″ polypropylene fibers were mixed with 40% by weight of fibers from Epolene C resin (M.P. about 100° C.) having a denier per filament range from 2 to 10 and cut 1½″. This blend was formed into a card web having a weight of 1 oz./sq. yd. (½″ thick). Hot air (130° C.) was blown through the batt for 5 minutes, after which it was allowed to cool. Microscopic examination showed the polypropylene to be bonded at many of the intersects and a very strong, light, foraminous structure was produced. The drawing shows the type of bonding produced.

EXAMPLE II

60% by weight of 5 d./f., 2" polypropylene fibers were mixed with 40% by weight of Epolene C of the type described in Example I. This mixture was carded, and the resultant card web bonded by heating with 60 lbs. steam under moderate pressure for 1 minute in a Hoffman press. The resulting batt was moderately dense and had good strength in all directions.

EXAMPLE III

80% by weight of 5 d./f., 2" polypropylene fibers were mixed with 20% by weight of Epolene C as described in Example I, and formed into a card web. This web was then bonded under light pressure and heated from 60 lbs. steam for 1 minute in a Hoffman press. The resulting batt was well bonded, had good strength in all directions, and weighed about 1 oz./sq. yd. (½" thick). This batt was used in innerliners to give good insulation.

EXAMPLE IV

A batt was made from 60% polypropylene fibers and 40% of a binder fiber prepared from a polyethylene wax having a melting point of 120° C. The batt was prepared in the manner as described in Example I except that bonding was accomplished at 140° C. The resulting non-woven structure was of medium density, had good strength in all directions, and was able to withstand temperatures of 100° C. without mechanical deterioration.

EXAMPLE V

Another blend was prepared using 70% by weight of 5 d./f., 2" polypropylene fibers and 30% by weight of fibers of a polyethylene wax having a melting point of 120° C. This web was calendered under 2000 lbs. pressure at 130° C. to produce a dense, strong polypropylene structure. It was used in battery separator plates with excellent solvent resistance.

EXAMPLE VI

Polyethylene having a specific gravity of 0.907 and a viscosity at 300° F. of approximately 9000 centipoises was extruded into a 32-oz. propellent stream directed at right angles thereto and the filaments formed by said propellent stream were collected as fibrous tow moving substantially countercurrently to the direction of said propellent stream. The fibrous tow contained filaments of a variable denier per filament of 4–20. A batt was prepared by blending 60% by weight of 8 d./f. 2" polypropylene fibers with 40% by weight of the polyethylene tow. This blend was formed into a card web having a weight of 5 oz./sq. yd. (1" thick). Hot air (130° C.) was blown through the batt for 5 minutes after which it was allowed to cool. Microscopic examination showed that the polypropylene non-woven fabric was bonded at many of the filament intersects into a strong, light, foraminous structure.

EXAMPLE VII

A 60,000 total denier tow comprised of 20 d./f. round cross section polypropylene fibers was crimped to 12 crimps per inch and then heatset for 5 minutes at 125° C. The heatset tow was opened, sprayed with 5% solids from a 25% solids polyethylene wax emulsion and made into 24.8 mm. x 102 mm. filter rods. Twenty rods were heated in an oven for 3 minutes at 110° C. The 20 heated rods along with 20 unheated and 20 control rods without binder were checked for hardness and pressure drop. The rod hardness values for the heated, unheated, and control rods were 6.90, 13.0, and 15.0 respectively. The pressure drops of the heated, unheated, and control rods were 3.1, 3.4, and 3.5 inches of water, respectively.

It will be noted from the above data that the presence of the polyethylene did not significantly effect rod pressure drop but did make a very significant improvement in rod hardness.

The bonded rods retained a high degree of rigidity, were easier cut, and produced a cleaner cut than did the unbonded rods. The pressure drop was determined by measuring the pressure differential required to produce an air flow through the filter of 1050 cc./minute.

The rod hardness was determined by measuring the deformation of the rod when subjected to a sudden load of 347.5 grams. The lower hardness values represent the harder rods.

EXAMPLE VIII

A 65,000 total denier tow comprised of 20 d./f. round cross section polypropylene fibers was crimped to 12 crimps per inch and heatset for 5 minutes at 125° C. The crimped and heatset tow was opened and sprayed with 5% solids from a 25% solids polyethylene wax emulsion. The sprayed tow was made into 24.8 mm. x 102 mm. filter rods and heated for 0, ½, 3, and 5 minutes at 110° C. and 125° C. The treated rods were checked for hardness and pressure drop by the same methods described in Example VII. The results are tabulated below.

| Sample No. | Percent Binder | Bonding Time in Minutes | Bonding Temp., ° C. | Rod Hardness | Rod Pressure Drop |
|---|---|---|---|---|---|
| 1 | 5 | 0 | | 13.5 | 5.0 |
| 2 | 5 | ½ | 110 | 9.2 | 4.8 |
| 3 | 5 | 3 | 110 | 5.6 | 4.5 |
| 4 | 5 | 5 | 110 | 4.4 | 4.5 |
| 5 | 5 | ½ | 125 | 5.9 | 4.2 |
| 6 | 5 | 3 | 125 | 4.7 | 4.9 |
| 7 | 5 | 5 | 125 | 4.6 | 4.8 |

It will be noted from the above table that the maximum hardness value for these particular rods appears to be about 4.5. It will also be noted that this value is obtained after 5 minutes at 110° C. and after only 3 minutes at 125° C. This shows that bonding time here is a function of the bonding temperature and that these very low bonding times may be used if the bonding temperature is raised.

A hardness value of 9.2 is adequate for commercial processing. In the above table this value was obtained after only 30 seconds at 110° C.

EXAMPLE IX

A 60,000 total denier tow comprised of 5 d./f. round cross section polypropylene fibers was crimped to 16–18 crimps per inch and heatset for 20 minutes at 120° C. The heatset tow was opened and made into 24.8 x 102 mm. filter rods with and without binder. The samples with binder were made by spraying the opened tow with 10% solids from a 25% solids polyethylene wax emulsion and forming into rods. Twenty filter rods with binder were heated in an oven for 10 minutes at 110° C. and checked for pressure drop and hardness. An additional 20 rods were checked for pressure drop and hardness without heating. A control sample without binder was also evaluated. Pressure drop and hardness were determined by the methods described in Example VII. The results are tabulated below.

| Rod Identification | Hardness | Pressure Drop |
|---|---|---|
| No binder, no heating | 19.4 | 12.1 |
| 10% Binder, no heating | 11.7 | 14.8 |
| 10% Binder heated, 10 mm. at 110° C. | 2.3 | 8.9 |

The bonded rods were easier cut and produced a cleaner cut than did the unbonded rods.

EXAMPLE X

Twenty d./f. regular cross-section polypropylene yarn was wound into 60,000, 65,000, and 75,000 total denier skeins and crimped. Samples of tow were crimped at 12 and 18 crimps per inch using approximately 10 p.s.i.g. steam. One set of tows (60,000 and 75,000 denier) was heatset for 5 minutes at 125° C. without drying. The second set of tows (65,000 denier) was dried at 90° C. and then heatset for 5 minutes at 125° C.

The heatset tows were opened by hand, sprayed with approximately 5% binder from an approximately 25% solids polyethylene wax emulsion and made into 24.8 mm. x 102 mm. rods.

Rod samples containing polyethylene wax and amorphous polypropylene were made from the 60,000 denier tow while 75,000 denier tow was bonded with polyethylene wax alone. The polyethylene wax was applied from a food grade emulsion.

These rods were bonded by heating for 3 minutes at 110° C. Unheated rods were also checked.

The second set of tows (65,000 total denier dried and then heatset) were sprayed with 5% of polyethylene wax emulsion. Rod samples from this group were heated for 0.50, 1.0, 3.0, and 5.0 minutes at 110° C. and 125° C. to effect bonding.

All rod samples were checked for hardness and pressure drop.

The polyethylene wax appeared to give a harder rod than the amorphous polypropylene. The amorphous polypropylene bonded rods had hardness values of 16.00 and 21.8 for the heated and unheated samples respectively. The hardness values for the heated and unheated polyethylene treated rods were 6.9 and 13.0 respectively.

Complete data for the above are shown in Table I hereinafter.

The second group of rods was bonded by a polyethylene wax treatment consisting of a bonding time-temperature series. Rod hardness increased with both increasing time and temperature. After 5 minutes bonding time the rod hardness appeared to level off. After ½ minute at 125° C. the 12 and 18 c.p.i. (crimps per inch) samples had hardness values of 5.9 and 8.2 respectively. The higher crimp level appeared to give slightly softer rods.

These data indicate that the pressure drop may decrease as the bonding time and temperature increase.

The second group of rods was dried at 90° C. and then heatset for 5 minutes at 125° C. This technique stabilized the polypropylene to the extent that it did not shrink when the filter rods were bonded.

Complete data on the time-temperature bonding series are shown in Table II, following.

*Table I.—Bonding of polypropylene filter rods*

| Fiber D/F | Total Denier | Tow Crimps/Inch | Heatsetting Time, Min. | Heatsetting Temp., °C. | Binder | Percent Binder | Rod Bonding Time, Min. | Rod Bonding Temp., °C. | Hardness Average | Hardness Range | Hardness Standard Deviation | Length, mm. | Pressure Drop in Water (inches) Average | Pressure Drop in Water (inches) Range |
|---|---|---|---|---|---|---|---|---|---|---|---|---|---|---|
| 20 | 60,000 | 12 | 5 | 125 | 25% solids, polyethylene wax emulsion. | 20 | None | None | 13.0 | 3.0–23.3 | 5.4404 | 102 | 3.40 | 2.9–4.3 |
| 20 | 60,000 | 12 | 5 | 125 | do | 20 | 3 | 110 | 6.90 | 3.3–11.8 | 1.7255 | 102 | 3.07 | 2.3–4.6 |
| 20 | 60,000 | 12 | 5 | 125 | 25% solids, amorphous polypropylene emulsion. | 20 | 3 | 110 | 16.0 | 3.4–25.7 | 4.5269 | 102 | 3.50 | 2.7–4.5 |
| 20 | 60,000 | 12 | 5 | 125 | do | 20 | None | None | 21.8 | 12.8–26.9 | 2.8623 | 102 | 3.43 | 2.5–4.5 |
| 20 | 60,000 | 12 | None | None | None | None | None | None | 15.0 | 4.6–19.1 | 5.5932 | 102 | 3.51 | 3.0–4.5 |
| 20 | 75,000 | 12 | None | None | 25% solids, polyethylene wax emulsion. | 20 | None | None | 16.5 | 6.5–22.4 | 5.8830 | 102 | 4.93 | 4.4–6.2 |
| 20 | 75,000 | 12 | None | None | do | 20 | 3 | 110 | 8.9 | 5.1–14.6 | 3.5150 | 102 | 4.77 | 3.8–5.4 |

*Table II.—Effect of time and temperature on bonding of polypropylene filter rods*

| Filter D/F | Total Denier | Tow Crimps/Inch | Heatsetting Time, Min. | Heatsetting Temp., °C. | Binder | Percent Binder | Rod Bonding Time, Min. | Rod Bonding Temp., °C. | Hardness Average | Hardness Range | Hardness Standard Deviation | Length, mm. | Pressure Drop in Water (inches) Average | Pressure Drop in Water (inches) Range |
|---|---|---|---|---|---|---|---|---|---|---|---|---|---|---|
| 20 | 65,000 | 12 | 5 | 125 | 25% solids, polyethylene wax emulsion (sprayed). | 5 | ½ | 110 | 9.2 | 5.6–15.0 | 1.998 | 102 | 4.80 | 3.4–6.4 |
| 20 | 65,000 | 12 | 5 | 125 | do | 5 | 1 | 110 | 12.3 | 6.0–18.8 | 3.104 | 102 | 4.87 | 4.3–6.3 |
| 20 | 65,000 | 12 | 5 | 125 | do | 5 | 3 | 110 | 5.6 | 3.5–14.0 | 1.538 | 102 | 4.50 | 3.7–5.7 |
| 20 | 65,000 | 12 | 5 | 125 | do | 5 | 5 | 110 | 4.4 | 2.7–7.6 | 1.313 | 102 | 4.55 | 3.7–6.0 |
| 20 | 65,000 | 12 | 5 | 125 | do | 5 | ½ | 125 | 5.9 | 3.4–11.9 | 1.873 | 102 | 5.25 | 4.5–5.9 |
| 20 | 65,000 | 12 | 5 | 125 | do | 5 | 1 | 125 | 6.2 | 2.8–9.0 | 1.928 | 102 | 4.87 | 4.0–5.6 |
| 20 | 65,000 | 12 | 5 | 125 | do | 5 | 3 | 125 | 4.7 | 2.7–9.2 | 1.481 | 102 | 4.88 | 4.1–5.6 |
| 20 | 65,000 | 12 | 5 | 125 | do | 5 | 5 | 125 | 4.6 | 2.8–5.7 | 0.934 | 102 | 4.80 | 4.1–5.8 |
| 20 | 65,000 | 18 | 5 | 125 | do | 5 | ½ | 110 | 11.2 | 4.2–18.2 | 3.273 | 102 | 5.63 | 3.9–7.3 |
| 20 | 65,000 | 18 | 5 | 125 | do | 5 | 1 | 110 | 9.1 | 4.2–15.2 | 2.371 | 102 | 5.71 | 4.2–7.5 |
| 20 | 65,000 | 18 | 5 | 125 | do | 5 | 3 | 110 | 6.4 | 3.8–12.5 | 1.984 | 102 | 5.41 | 4.7–6.8 |
| 20 | 65,000 | 18 | 5 | 125 | do | 5 | 5 | 110 | 4.3 | 3.0–6.0 | 0.827 | 102 | 5.08 | 4.5–6.3 |
| 20 | 65,000 | 18 | 5 | 125 | do | 5 | ½ | 125 | 8.2 | 4.5–11.5 | 1.481 | 102 | 5.69 | 4.5–7.0 |
| 20 | 65,000 | 18 | 5 | 125 | do | 5 | 1 | 125 | 8.2 | 3.5–13.1 | 3.055 | 102 | 5.41 | 3.8–7.0 |
| 20 | 65,000 | 18 | 5 | 125 | do | 5 | 3 | 125 | 5.3 | 2.5–10.0 | 1.988 | 102 | 5.36 | 4.1–6.6 |
| 20 | 65,000 | 18 | 5 | 125 | do | 5 | 5 | 125 | 4.1 | 2.3–6.7 | 1.149 | 102 | 5.19 | 4.0–6.5 |

EXAMPLE XI

A 5 d./f. 30,000 total denier polypropylene tow was crimped to 16–18 crimps per inch. Approximately 5 p.i.s.g. steam was used on the crimper. The crimped tow was heatset in an oven for 20 minutes at 120° C.

Two ends of heatset tow were opened by hand, sprayed with a 25% solids polyethylene wax emulsion, and made into 102 mm. x 24.8 mm. rods. Rod samples were made at approximately 5%, 10%, and 15% by weight of polyethylene. A sample of rods without binders was made as a control. Samples of rods from each polyethylene concentration were heated in an oven for 10 minutes at 95° C. and 110° C. The heatset, unheated and control rods were tested for hardness and pressure drop. Seventeen mm. tips were cut from each set of rods and checked for pressure drop and total removal.

Complete results are shown in Table III, which follows.

We claim:
1. A vapor permeable non-woven fibrous element comprising substantially longitudinally aligned continuous filaments of polypropylene bonded at a substantial number of the intersects of said filaments with polyethylene.
2. The element of claim 1 wherein polyethylene is fibrous polyethylene heated to a temperature sufficiently high to cause it to flow to said intersects to form bonds thereat without substantially softening said filaments of polypropylene.
3. The element of claim 1 wherein the polyethylene is fibrous polyethylene having a viscosity in the neighborhood of 8000 centipoises at 20° C. above its accepted ASTM D36–26 ring and ball softening accepted flow point.
4. The element of claim 1 wherein the polyethylene is a low molecular weight emulsifying polyethylene wax.

*Table III.—Bonded polypropylene filter rods*

| Fiber Identification | Crimps, Per Inch | Binder | Percent Binder | Curing Conditions | Rod | | | Tip | | |
|---|---|---|---|---|---|---|---|---|---|---|
| | | | | | Length, mm. | Pressure Drop in Water (inches) | Hardness | Length, mm. | Pressure Drop in Water (inches) | Percent Removal (Total) |
| 5 D/F polypropylene 60,000 total denier. | 16–18 | 25% solids, polyethylene wax emulsion (sprayed). | 5 | None | 102 | 13.3 | 14.7 | 17 | 2.89 | 25 |
| Do | 16–18 | do | 5 | 10 min. at 95° C. in oven | 102 | 10.9 | 10.0 | 17 | 2.45 | 22 |
| Do | 16–18 | do | 5 | 10 min. at 110° C. in oven | 102 | 9.2 | 4.3 | 17 | 1.93 | 17 |
| Do | 16–18 | do | 10 | None | 102 | 14.8 | 11.7 | 17 | 2.67 | 31 |
| Do | 16–18 | do | 10 | 10 min. at 95° C. in oven | 102 | 11.6 | 6.9 | 17 | 2.49 | 25 |
| Do | 16–18 | do | 10 | 10 min. at 110° C. in oven | 102 | 9.9 | 2.3 | 17 | 1.88 | 15 |
| Do | 16–18 | do | 15 | None | 102 | 20.7+ | 8.3 | 17 | 4.85 | 36.5 |
| Do | 16–18 | do | 15 | 10 min. at 95° C. in oven | 102 | 17.6 | 3.2 | 17 | 3.85 | 25.5 |
| Do | 16–18 | do | 15 | 10 min. at 110° C. in oven | 102 | 10.3 | 1.9 | 17 | 1.96 | 55 |
| Do | 16–18 | None | None | None | 102 | 12.1 | 19.4 | 17 | 2.53 | 22.5 |

When staple fibers are used the staple length of the polypropylene which may be bonded with polyethylene fibers in accordance with our invention may be varied, for example from 1–10 inches. The polyethylene used as the bonding medium may be produced by conventional melt extrusion techniques as well as the method of our copending application Serial No. 54,929. The polyolefins referred to above and the polyolefins used in the above examples are commercially available. They may be prepared, for example, as disclosed in our co-worker's U.S. Patent 2,835,659.

Although the invention has been described in considerable detail with particular reference to certain preferred embodiments thereof, variations and modifications can be effected within the spirit and scope of the invention as described hereinabove, and as defined in the appended claims.

5. A polypropylene non-woven fabric bonded at a substantial number of intersects by polyethylene.

References Cited by the Examiner

UNITED STATES PATENTS

| | | | |
|---|---|---|---|
| 2,465,996 | 4/1949 | Bloch | 161—157 X |
| 2,795,290 | 6/1957 | Butsch et al. | |
| 2,966,157 | 12/1960 | Touey et al. | 131—208 |
| 3,030,690 | 4/1962 | Mizell | 28—72 |
| 3,073,002 | 1/1963 | Munt | 161—172 |
| 3,117,055 | 1/1964 | Guandique et al. | 161—170 |
| 3,117,056 | 1/1964 | Katz et al. | 161—170 |
| 3,128,527 | 4/1964 | Schulz et al. | 28—72 |
| 3,144,025 | 8/1964 | Erlich. | |

EARL M. BERGERT, *Primary Examiner.*

MORRIS SUSSMAN, *Examiner.*